March 6, 1962     G. D'AMBROSE, JR     3,023,510
ATTACHMENT FOR DEPTH MICROMETER
Filed May 26, 1958
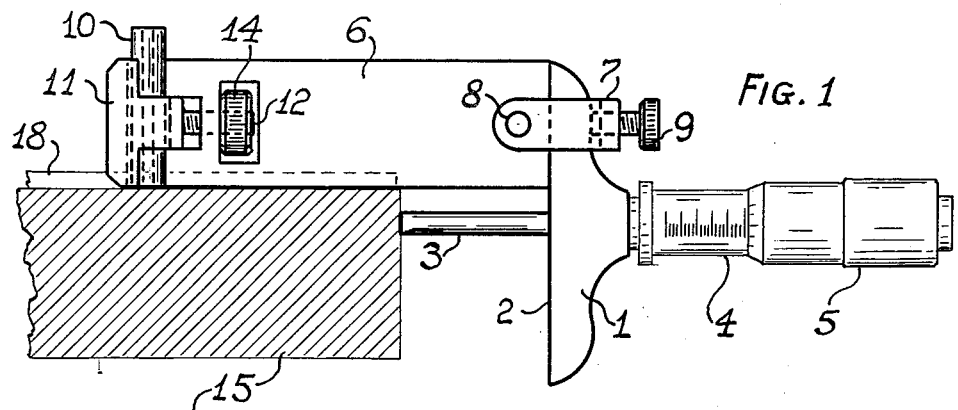
FIG. 1
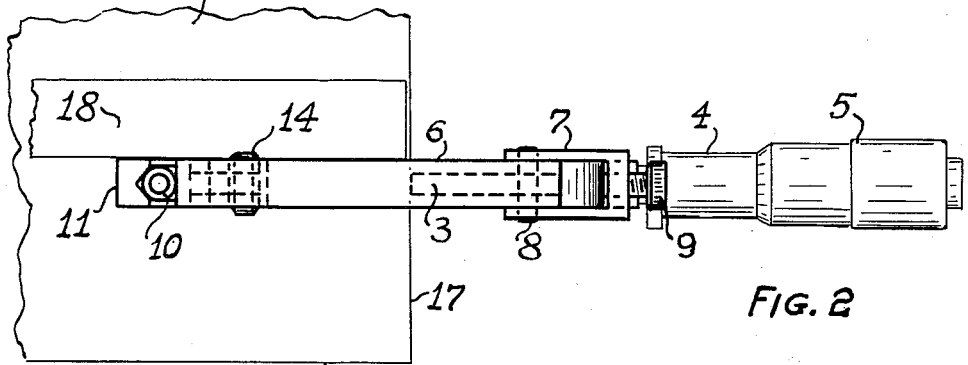
FIG. 2
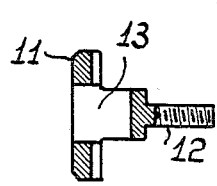
FIG. 3
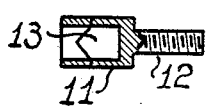
FIG. 4
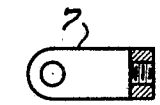
FIG. 5
FIG. 6
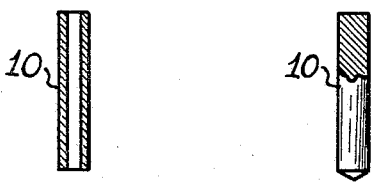
FIG. 7     FIG. 8
GAETANO D'AMBROSE, Jr.
INVENTOR.
BY J. O. Salley
Patent Agent

United States Patent Office 3,023,510
Patented Mar. 6, 1962

3,023,510
ATTACHMENT FOR DEPTH MICROMETER
Gaetano D'Ambrose, Jr., Carrington Road,
Bethany, Conn.
Filed May 26, 1958, Ser. No. 737,570
3 Claims. (Cl. 33—189)

My invention relates to micrometer attachments and more particularly to attachments for depth micrometers.

In the metalworking industries the accurate location of the bored holes is often of paramount importance on which the proper functioning of the product depends. In well equipped machine shops the accurate location of the bored holes is usually accomplished by jig boring machines and other highly complex and expensive machine tools, the purchasing of which is beyond the financial capacity of the smaller machine shop.

The principal object of my invention is to provide an attachment for the depth micrometer, usually available in even the smallest machine shop, which will enable the small machine shop to locate the holes to be bored in metal blocks with great accuracy, otherwise obtainable only by the use of elaborate and expensive machine tools not available in these small machine shops.

Another important object of my invention is to provide an attachment for the depth micrometer which is inexpensive to manufacture and very easy and convenient to use for the very accurate locating of the holes to be bored, also for various other measuring practices, known in the art, for which the customary depth micrometer attachments of the prior art are applicable.

Other objects and advantages of my invention will be apparent during the course of the following description.

In the accompanying drawing, forming a part of the present application, wherein for the purpose of illustration a preferred form and a modification of my invention are shown, FIGURE 1 is a side elevational view of the preferred form of my invention mounted on a depth micrometer,
FIGURE 2 is a plan view of the same,
FIGURE 3 is a vertical sectional view of the clamp,
FIGURE 4 is a horizontal sectional view of the same,
FIGURE 5 is a vertical sectional view of the micrometer connector,
FIGURE 6 is a horizontal sectional view of the same,
FIGURE 7 is a vertical sectional view of the preferred form of the locating pin,
FIGURE 8 is a partial sectional view of a modified form of the locating pin.

Referring to FIGS. 1 and 2 of the drawing, the numeral 1 designates a depth micrometer of the customary type and construction, having a base 2, a measuring rod 3, a sleeve 4 secured to said base, and a rotatable sleeve 5 controlling the exposed length of the measuring rod 3.

Secured to the base 2 of the depth micrometer 1 is the attachment block 6, which is precision ground to the same thickness as the base of the depth micrometer and having accurately positioned perpendicular adjacent sides and parallel opposing sides. The length of the attachment block 6 corresponds accurately to a chosen predetermined value, preferably a whole number of inches.

This attachment block 6 is attached to the depth micrometer 1 by means of the micrometer connector 7, which consists of a U-shaped clamp pivotally secured to the attachment block 6 by the pivot 8 and provided with a clamping screw 9 bearing on the back of the micrometer base 2.

The attachment block 6 thus secured to the depth micrometer 1 will have its longitudinal sides strictly perpendicular to the base 2 of the micrometer and strictly parallel to the measuring rod 3.

Adjoining the free end of the attachment block 6 (see FIGS. 1 and 2) is the locating pin 10 which, in this preferred form, is cylindrical with an accurately positioned central hole. This pin 10 is secured to the attachment block 6 by the clamp 11 which is T-shaped and has an aperture 13 with a V-groove to hold the pin 10 in the exact centerline of the attachment block 6. Clamp 11 has a threaded stud 12 passing through a hole of the attachment block 6 and is secured to it by the nut 14. The clamp 11 is precision ground to the same thickness as the attachment block 6.

The details of the construction of this clamp 11 are more clearly shown in the sectional views of FIGS. 3 and 4.

The sectional views of FIGS. 5 and 6 illustrate the construction of the micrometer connector 7.

FIG. 7 gives a sectional view of the preferred form of the locating pin 10; FIG. 8 shows a modified form of the locating pin 10, being solid without a central hole and having a centrally located sharp point at one end.

In order to illustrate the novel application of my invention for the accurate locating of holes to be bored, FIGS. 1 and 2 include a work piece 15 having the adjacent sides 16 and 17, used as reference lines in defining the location of the hole to be bored in the work piece. The numeral 18 designates a straight edge disposed on the top surface of the work piece 15 adjacent to the attachment block 6.

The operation of my invention is as follows:

Referring to FIGS. 1 and 2 of the drawing, the present task is the accurate locating of a hole in the work piece 15 at specified distances from the reference lines 16 and 17, respectively. The first step is to lay a straight edge 18 on the top surface of the work piece 15 and position it so as to be strictly parallel to the reference line 16 and the distance from the reference line 16 to the nearest line of the straight edge 18 to be equal to the specified distance of the proposed hole from the line 16 plus the one-half of the thickness of the attachment block 6. This positioning is accomplished with my device in the following manner: By unscrewing the nut 14 (see FIG. 1) the clamp 11 and the locating pin 10 are removed from the attachment block 6. Then, the attachment block 6 is connected to the depth micrometer 1 in the manner shown in FIG. 1 and the length of the micrometer rod 3 is so adjusted by means of the sleeve 5 that the distance from the free end of the attachment block to the end of the rod 3 is equal to the specified distance of the proposed hole from the reference line 16 plus the one-half of the thickness of the attachment block. Then, the attachment block is placed on the top surface of the work piece 15 so that the end of the rod 3 contacts the reference line 16 and the longitudinal side of the attachment block 6 is strictly perpendicular to the said line 16, as ascertained by a conventional square, or equivalent instrument. In this position the straight edge 18 is deposited on the top surface of the work piece 15 so that the straight edge is in full contact with the end surface of the attachment block 6. After checking in this manner the distance of the straight edge 18 from the reference line 16 at several points of the straight edge, the straight edge is secured in position on the top surface of the work piece 15.

As the next step, the locating pin 10 and the clamp 11 are reinstalled, as shown in FIGS. 1 and 2, and the micrometer rod 3 is readjusted by means of the sleeve 5 so that the distance from the outer end of the attachment block 6 to the end of the rod 3 is equal to the specified distance of the proposed hole from the second reference line 17 minus one-half of the diameter of the locating pin 10. The so adjusted assembly is placed on the top surface of the work piece 15 so that the longitudinal side of the attachment block is in full contact with the straight edge 18 and the end of the micrometer rod 3 is in contact with the reference line 17, as illustrated in FIGS. 1 and 2.

In the position of my instrument thus obtained the geometric axis of the locating pin 10 represents the axis of the hole to be bored as defined by the specified distances from the reference lines 16 and 17. The final step is the application of the indicating means to indicate and mark the position of this axis on the top surface of the work piece 15. This indicating means embodied in the locating pin 10 consists of a small axial hole, in the preferred form of my invention, which permits the marking of the center of the hole to be bored by a small drill or center punch accurately fitting the hole of the locating pin 10. In the modified form of the locating pin, shown in FIG. 8, the indicating means consists of a centrally located sharp point at the end of the pin to be used as a center punch for the marking of the hole to be bored.

The concept underlying my invention is the combination of the customary depth micrometer with a simple and inexpensive attachment and thereby utilize the micrometer to perform a new function, the accurate location of holes to be bored in work pieces, which hitherto required the application of high priced machine tools usually not available in the small machine shops. The application of my invention, however, is not confined to this operation; its utility is further enhanced by the fact that it can perform also several other measuring operations, commonly practiced in the art, which are beyond the scope of the customary depth micrometer and hitherto required the use of special instruments. For instance, by placing the precision ground outer end surface of the attachment block 6 on a flat surface the longitudinal sides of this block 6 will be strictly perpendicular to said surface and the connected depth micrometer may be used as a precision height gauge.

It is to be understood that the forms of my invention herein shown and described are to be taken as examples of the same, and that various changes in the shape, size, and arrangement of the parts may be restored to, without departing from the spirit of my invention or the scope of the subjoined claims.

I claim:
1. An attachment for a customary depth micrometer having a base, comprising in combination an attachment block having two parallel end surfaces at a predetermined distance from each other, and four longitudinal sides perpendicular to said end surfaces, one of said end surfaces being in full contact with the base of the micrometer; a micrometer connector pivotally connected to said attachment block and is provided with a clamping screw engaging said base of the micrometer to secure the said attachment block in position relative to said base of the micrometer; a locating pin, cylindrical in shape disposed in full longitudinal contact with the other end surface of the said attachment block; a clamp surrounding said locating pin and being provided with a threaded stud and a nut engaging the said attachment block to secure said locating pin in position relative to said attachment block; indicating means to indicate the location of the central geometric axis of said locating pin.

2. The depth micrometer attachment of claim 1 in which said indicating means consists of a coaxial hole provided in the said locating pin.

3. The depth micrometer attachment of claim 1 in which said indicating means consists of a centrally located sharp point provided at one end of the said locating pin.

References Cited in the file of this patent
UNITED STATES PATENTS

| | | |
|---|---|---|
| 1,463,095 | Rudnay | July 24, 1923 |
| 1,668,683 | Koubek | May 8, 1928 |
| 2,273,954 | Grass | Feb. 24, 1942 |
| 2,335,513 | Hewitt | Nov. 30, 1943 |
| 2,626,463 | Deakin | Jan. 27, 1953 |